United States Patent
Ho et al.

(10) Patent No.: US 8,000,583 B2
(45) Date of Patent: *Aug. 16, 2011

(54) METHOD AND APPARATUS FOR PLAYING AN UNFINALIZED RECORDABLE DISC

(75) Inventors: Shui-Hsiang Ho, Hsin-Chu (TW); Yuan-Ching Lin, Chu-Pei (TW)

(73) Assignee: MediaTek Inc. (TW)

( * ) Notice: Subject to any disclaimer, the term of this patent is extended or adjusted under 35 U.S.C. 154(b) by 1427 days.

This patent is subject to a terminal disclaimer.

(21) Appl. No.: 11/489,927

(22) Filed: Jul. 19, 2006

(65) Prior Publication Data

US 2008/0019676 A1    Jan. 24, 2008

(51) Int. Cl.
H04N 9/80    (2006.01)
H04N 5/89    (2006.01)
(52) U.S. Cl. ........................ 386/262; 386/336
(58) Field of Classification Search .......... 386/125, 386/124, 45, 46, 95, 126, 336, 262, 264, 386/268, 326, 332, 334
See application file for complete search history.

(56) References Cited

U.S. PATENT DOCUMENTS

| | | | | |
|---|---|---|---|---|
| 6,879,554 | B2 * | 4/2005 | Shimamura et al. | ....... 369/53.22 |
| 2005/0232609 | A1 | 10/2005 | Eckleder | |
| 2006/0262712 | A1 * | 11/2006 | Suh et al. | ................... 369/275.3 |
| 2007/0081795 | A1 | 4/2007 | Katata et al. | |
| 2007/0086279 | A1 * | 4/2007 | Wu et al. | ..................... 369/30.04 |
| 2007/0258350 | A1 | 11/2007 | Katata et al. | |
| 2008/0013427 | A1 * | 1/2008 | Sako et al. | ................. 369/53.21 |

FOREIGN PATENT DOCUMENTS

| | | |
|---|---|---|
| CN | 1503238 A | 6/2004 |
| CN | 1953088 A2 | 4/2007 |
| TW | I235361 | 7/2005 |
| TW | 200625279 | 7/2006 |

OTHER PUBLICATIONS

Sungyang Chao Wu; "A Method for Writing to a Reproducible and Unfinalized Disc, a Method for Forming a Finalized Disc, a Device for Recording on a Reproducible and Unfinalized Disc."; esp@cenet; Chinese Publication No. CN1953088 (A); Publication Date: Apr. 25, 2007; esp@cenet Database—Worldwide, http://v3.espacenet.com/publicationDetails/biblio?DB=EPODOC&adjacent=true&locale=....

(Continued)

*Primary Examiner* — Robert Chevalier
(74) *Attorney, Agent, or Firm* — The Law Offices of Andrew D. Fortney; Andrew D. Fortney; Ryan S. Dunning

(57) ABSTRACT

Methods, software, apparatus, and systems for reading a recordable optical disc. The method generally comprises the steps of (a) determining whether a lead-in area on the disc contains valid lead-in data and, when the lead-in area does not contain valid lead-in data, and (b) searching an area on the disc (e.g., searching for directory data, such as RSAT or VAT data). The present invention advantageously allows a disc playback device (e.g., a DVD player) to locate disc type information even on discs that are unfinalized (e.g., where no lead-in data has been recorded in the lead-in area of the disc).

29 Claims, 5 Drawing Sheets

OTHER PUBLICATIONS

Yuanding Wu; "Method for Obtaining Track Relative Specific Information in Optical Disc Initialization and Optical Reading Device"; esp@cenet; Chinese Publication No. CN1503238 (A); Publication Date: Jun. 9, 2004; esp@cenet Database—Worldwide, http://v3.espacenet.com/publicationDetails/biblio?DB=EPODOC&adjacent=true&locale=....

Chinese Office Action date stamped Nov. 6, 2009; Chinese Patent Application No. 2007101089807; 8 pgs. total; The State Intellectual Property Office of P.R.C., People's Republic of China.

Keiji Katata, Masayochi Yoshida, Toshiro Tanikawa and Kazuo Kuroda; "Information Recording Medium, Information Recording Apparatus and Method, Information Reproducing Apparatus and Method, and Recording Medium"; Taiwanese Patent Publication No. 200625279 (Biblio); Issued/Publication Date: Jul. 16, 2006; Taiwan Intellectual Property Office, Taiwan.

Miyuki Sasaki, Yoshiho Gotoh and Yoshihisa Fukushima; "Information Recording Medium, Information Recording Method, Information Reproducing Apparatus, Information Reproducing Method, and Information Reproducing Apparatus"; esp@cenet; Taiwanese Publication No. TW235361 (B); Publication Date: Jul. 1, 2005; espacenet database—Worldwide, http://v3.espacenet.com/publicationDetails/biblio?DB=EPODOC&adjacent=....

* cited by examiner

METHOD AND APPARATUS FOR PLAYING AN UNFINALIZED RECORDABLE DISC

FIELD OF THE INVENTION

The present invention generally relates to the field of optical disc recording. More specifically, embodiments of the present invention pertain to methods and apparatus for reading unfinalized recordable discs.

DISCUSSION OF THE BACKGROUND

DVD technology comprises a wide and growing variety of disc and application specifications. Disc specifications include, for example, DVD-ROM for pre-recorded discs, DVD-R and DVD+R for write-once discs, and DVD-RW, DVD-RAM, and DVD+RW for rewritable discs. The disc format specifications generally define the physical characteristics of the disc (e.g., mechanical properties, optical signal characteristics, physical arrangement, writing methods, and testing conditions). Application specifications include DVD-Video for video content, DVD-Audio for audio content, and DVD-VR and DVD+VR for real-time video recording (e.g., in camcorders and personal video recorders [PVRs]).

The structure and format of data recorded to optical media is generally defined and described in the family of Universal Disk Format (UDF) specifications. The Optical Storage Technology Association (OSTA) has developed and implemented the UDF to enable file interchange among different operating systems and environments. In general, UDF was developed to implement the ISO/IEC 13346 specification (also known as ECMA 167). Whereas ISO/IEC 13346 is a broad, general standard for storing information on any media, the UDF specifically provides a standard for recording data to a plurality of recordable and rewritable optical media including CD-ROM, CD-Recordable (CD-R), and CD-Rewritable (CD-RW) as well as DVD-ROM, DVD-R, DVD-RW, DVD+R, DVD+RW, double density media, multi-layered media, and others. Although terms such as "operating system," and the process of recording data, suggest a computer system environment, UDF is generally applicable to and defines the format for consumer CD audio devices for home and mobile audio systems, consumer DVD devices for both home and mobile DVD audio/visual systems, in addition to the many and varied computer system environments.

The UDF specification includes a number of revisions, some of which were developed and released to capture and implement standards for emerging and developing optical media technologies. By way of example, UDF Revision 1.02 includes standards and formats for DVD devices; UDF Revision 1.50 includes standards and formats for defect management and packet writing; UDF Revision 2.0 includes standards and formats intended to supersede Revision 1.50, and adds standards and formats for streaming and improved security control for optical media; and UDF Revision 2.01 includes standards and formats to update Revision 2.0, and adds standards and formats for real time files.

Multi-session and multi-border recording to optical media is an example of one advancement in optical media technology that was captured in the UDF specification during the periodic revision cycle. Prior to UDF Revision 1.50, no multi-session or multi-border standards or formats were implemented in the UDF. Beginning with UDF Revision 1.50, multi-session and multi-border recording is implemented in UDF. UDF Revision 1.02, however, does not include implementation of multi-session or multi-border recording, and therefore DVD devices compliant with UDF Revision 1.02 do not support multi-session or multi-border optical media. Consumer DVD devices such as, by way of example, DVD players used with television sets or audio/visual systems are generally UDF Revision 1.02 compliant, and therefore generally do not support or recognize multi-session or multi-border optical media. Generally, if a multi-session or multi-border DVD is inserted into a UDF Revision 1.02 compliant consumer DVD player, the consumer DVD player will only "see" one session. Typically, only the first session of the multi-session DVD is seen by the consumer DVD player, and therefore only the content of the first session is accessible for viewing.

The DVD-Video format was originally designed to meet the requirements of the film industry for distributing commercial movies on prerecorded (pressed) discs. Typically, discs written in DVD-Video format can be played back using most standards-compliant DVD video players or computer DVD-ROM drives employing appropriate software (subject to that device's physical compatibility with the specific type of disc). Recordable DVD formats may also contain DVD-Video data. Referring now to FIG. 1, DVD-Video data is shown on DVD-ROM, DVD+R, and DVD-R discs.

Due, in part, to the evolving nature of the DVD specifications, there can be mismatches between the application format and the capabilities of the disc format. For example, the DVD-Video format was initially designed to place static material on disc, and not to add to or change the material at a later time. To address this, several additional application formats were developed for use by consumer devices (e.g., writable DVD camcorders and consumer electronics [CE] recorders such as personal video recorders [PVRs]). Two of these new formats are the DVD-VR and DVD+VR real-time video formats. However, DVD-VR differs significantly from the original DVD-Video format. As a result, only devices specifically designed to be DVD-VR compatible (for example, units marked "RW compatible" and "DVD Multi") can play DVD-VR recorded discs.

In many optical disc specifications, an optical disc may comprise two areas, including a user data area and a disc information (lead-in) area. The user data area is generally used to write application data, including video, audio, information tables, file system data, etc. The disc information (lead-in) area generally includes data such as disc size, disc type, disc layout, etc. In some optical disc specifications (e.g., DVD-R and DVD+R), any portion of the disc can be written only once, although subsequent titles may be recorded to previously unused portions of the disc.

In order to perform real-time recording (e.g., in camcorders and PVRs), data may generally be written to the user data area of the disc. Each time additional material is recorded to the disc, the additional data may be appended to the previously written data. Once the user wishes to playback the disc on a standard DVD-Video player, the user must generally "finalize" the disc, in order to populate the disc information (lead-in) area of the disc. Once the write-once disc is finalized, it is effectively a read-only disc, because the disc information (lead-in) area cannot be changed. Consequently, any remaining space on the disc is generally unusable. Therefore, it is desirable for read-only disc playing devices (e.g., consumer electronics DVD players) to read and play back data (e.g., DVD-Video) from unfinalized recordable discs.

A disc generally includes a sequence of error correction code (ECC) blocks. In the DVD standards, each ECC block generally contains 16 sectors of 2,048 data bytes each. Sectors are numbered with a 24-bit address. An ECC block generally further includes headers, error detection code (EDC) symbols, and ECC symbols. Individual sector data are generally interleaved in order to minimize the effects of large media flaws. These ECC blocks are generally recorded serially on the medium. In order to read and extract a single sector of data, a disc reader generally reads the ECC block containing the sector, applies error correction to the ECC block, and de-interleaves prior to extracting the data from the selected sector.

Typically, the finalized disc information (lead-in) area contains the location of the final ECC block on the disc. The final ECC block typically contains metadata such as volume structure information (e.g., Virtual Allocation Table [VAT] on DVD-R discs, or reserve space allocation table [RSAT] on a DVD+R disc). Therefore disc players generally must locate the final ECC block in order to retrieve volume information and read the data on the disc.

DVD-R and DVD+R discs can be either single or double-sided. A single-sided (SS) disc may include a recordable side and a non-recordable ("dummy") side, while a double-sided (DS) disc may include two recording sides. The recording side of a DVD-R and DVD+R disc may include a number of layers. The substrate is generally a polycarbonate plastic containing a shallow spiral groove extending from the inside to the outside diameter of the disc. A DVD-R disc additionally includes "pits and lands" on the areas between the coils of the groove (land pre-pits). Added to this substrate is an organic dye recording layer (e.g., azo, cyanine, dipyrromethene or others), followed by a metal reflective layer (e.g., silver, silver alloy, gold). The non-recordable side of a single-sided disc generally includes an additional flat polycarbonate plastic substrate (sometimes with an additional metal layer to obscure the bonding layer from view for aesthetic purposes). An adhesive then bonds two recording sides (for a double-sided) or a recording and dummy side (for a single-sided) together into the final disc. Some single-sided discs are also topped on the dummy side with decorations or additional layers that provide surfaces suitable for labeling by inkjet, thermal transfer or re-transfer printers.

The first step in manufacturing a DVD-R or DVD+R disc is to fabricate the polycarbonate plastic substrates (incorporating the spiral groove and land pre-pits) using an injection molding process. The dye is then applied using spin coating and the metal layers by means of DC sputtering. After both sides of the disc are completed they are bonded together using a hot melt, UV cationic or free radical process. Additional decoration or printable layers are typically applied using screen printing methods. A DVD-R disc generally undergoes a further manufacturing step in which a specialized computer DVD recorder is used to "prewrite" information in the Control Data Zone of its Lead-in Area to inhibit direct copying of prerecorded DVD-Video discs encrypted with the Content Scrambling System (CSS).

DVD recording devices generally use a wobble signal transducer to demodulate the spiral groove and determine where data starts, the format of the discs, etc. Unlike DVD recording devices, many DVD players can not decode the wobble signal (e.g., address in pre-groove [ADIP] or pre-pit address encodings). Therefore, it may be difficult for such players to move the pick-up head(s) to the last metadata section of the disc and read the data back. Methods and devices for recording metadata sections to a disc such that disc playback devices can retrieve them from an unfinalized disc are described in U.S. patent application Ser. No. 11/403, 375, filed Apr. 12, 2006, pending, the relevant portions of which are hereby incorporated by reference. Therefore, it is also desirable for disc playback devices to be able to access the data on these and other unfinalized discs.

SUMMARY OF THE INVENTION

Embodiments of the present invention relate to methods, software, apparatus, and systems for reading a recordable optical disc. The method generally comprises the steps of (a) determining whether a lead-in area on the disc contains valid lead-in data and, when the lead-in area does not contain valid lead-in data, and (b) searching an area on the disc (e.g., searching for directory data, such as RSAT or VAT data). The software generally comprises algorithms and/or procedures that implement the inventive method(s). The apparatus generally comprises (a) a disc playback system configured to process data from the disc, (b) a servo system configured to read data from a lead-in area on the disc, and (c) a disc identification system configured to process the data from the lead-in area and, when the data from the lead-in area does not contain valid lead-in data, to instruct the servo system to search an area on the disc. The systems generally comprise those that include a disc reading apparatus embodying one or more of the inventive concepts disclosed herein.

The present invention advantageously allows a disc playback device (e.g., a DVD player) to locate disc type information even on discs that are unfinalized (e.g., where no lead-in data has been recorded in the lead-in area of the disc). The present invention is particularly advantageous in disc playback devices that lack a wobble signal transducer. Thus, the present invention advantageously allows users to view and/or share video content at any time without finalizing the disc (e.g., without recording on the lead-in area of the disc). Therefore, users may append additional data to the unfinalized disc and more fully utilize space on the disc.

These and other advantages of the present invention will become readily apparent from the detailed description of preferred embodiments below.

DETAILED DESCRIPTION OF THE PREFERRED EMBODIMENTS

Figure 1:
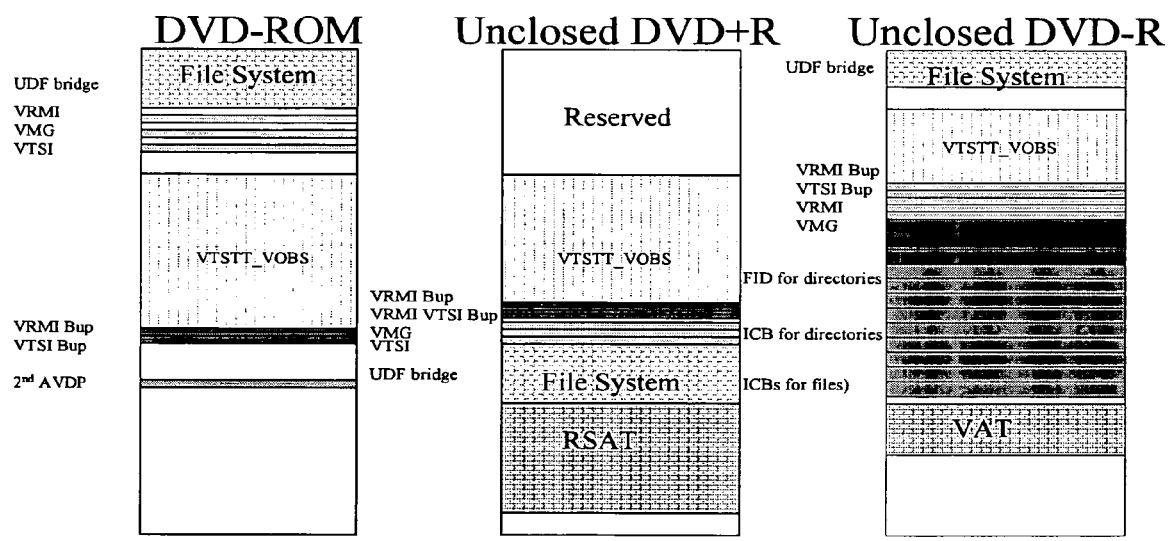
FIG. 1 is a diagram showing conventional optical disc data structures.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," or the like, refer to the action and processes of a computer, consumer electronics, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings. In addition, while reference may be made to operations concerning representations of video data, it will be recognized that the same or similar operations may be applied to arbitrary data types (e.g., audio data), or that the video data may further comprise audio or other data (e.g., subtitles, programming data, etc.)

The present invention concerns a method for reading a recordable optical disc. The method generally comprises the steps of (a) determining whether a lead-in area on the disc contains valid lead-in data and, when the lead-in area does not contain valid lead-in data, and (b) searching an area on the disc (e.g., searching for directory data, such as RSAT or VAT data). The software generally comprises algorithms and/or procedures that implement the inventive method(s).

A further aspect of the invention concerns an apparatus for reading a recordable optical disc. The apparatus generally comprises (a) a disc playback system configured to process data from the disc, (b) a servo system configured to read data from a lead-in area on the disc, and (c) a disc identification system configured to process the data from the lead-in area and, when the data from the lead-in area does not contain valid lead-in data, to instruct the servo system to search an area on the disc. Even further aspects of the invention concern systems that systems generally comprise those that include a disc reading apparatus embodying one or more of the inventive concepts disclosed herein.

The invention, in its various aspects, will be explained in greater detail below with regard to exemplary embodiments.

An Exemplary Method

In one aspect, the present invention relates to a method for reading a recordable optical disc. The method generally comprises the steps of (a) determining whether a lead-in area on the disc contains valid lead-in data and, when the lead-in area does not contain valid lead-in data, and (b) searching an area on the disc (e.g., searching for directory data, such as RSAT or VAT data).

Figure 2:
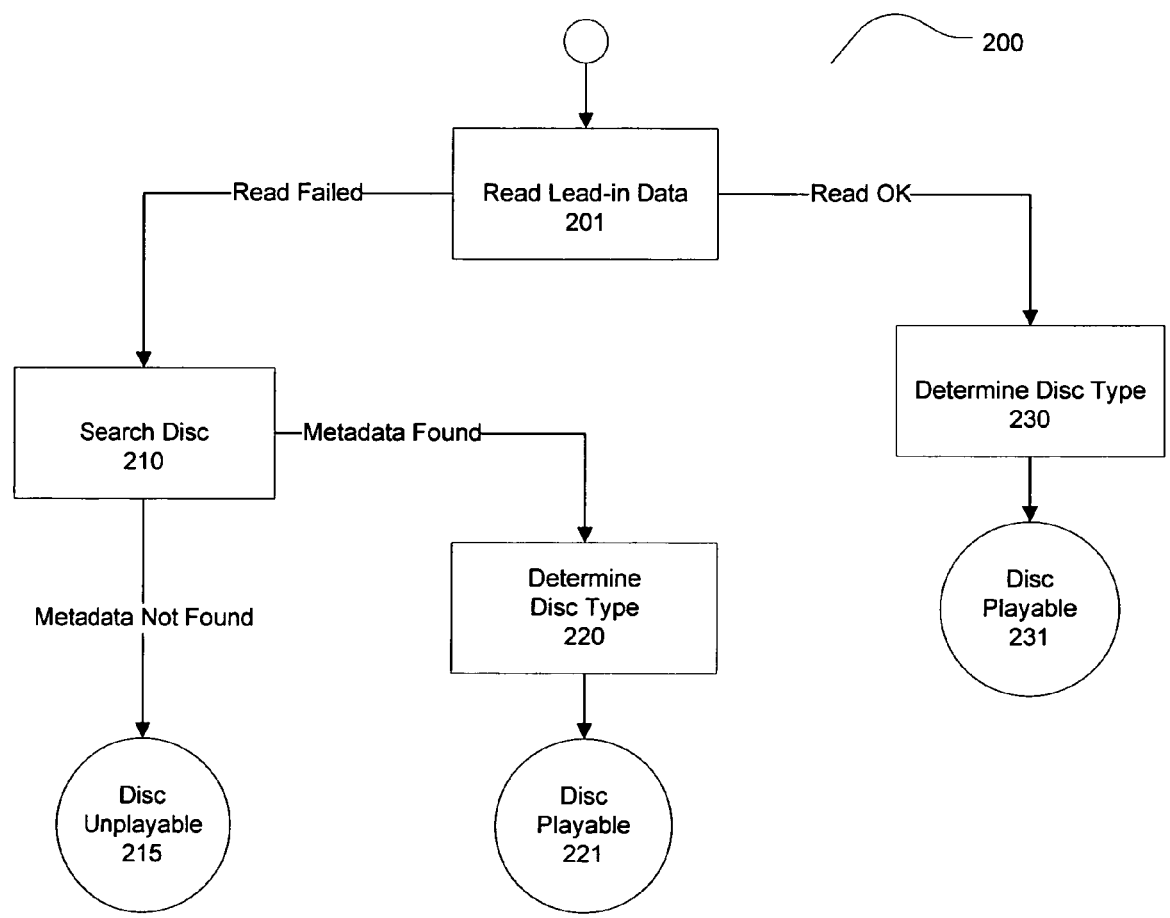
FIG. 2 is a flowchart showing an exemplary method according to the present invention.

Referring now to FIG. 2, a flowchart of exemplary method 200 is shown. In step 201, lead-in data is read from the lead-in area of an optical disc. When the lead-in data is read successfully (e.g., when the lead-in area contains valid lead-in data), the method may proceed to the conventional step 230 to determine the disc type based on the contents of the lead-in data and to play the disc (e.g., after step 231 of indicating [e.g., to a playback unit] that the disc is playable). When the lead-in data is not read successfully (e.g., when the lead-in area does not contain valid lead-in data, or when a disc servo system otherwise indicates a failure to read the lead-in data), the method may proceed to step 210 to search an area of the disc (e.g., to search for disc type information by searching for VAT or RSAT data). When disc type information is found on the disc, the method may proceed to step 220 to determine the disc type, and then play the disc (e.g., after step 221 of indicating [e.g., to a playback unit] that the disc is playable). When disc type information is not found, the method may proceed to step 215 to indicate that the disc is unplayable (e.g., because the disc contains no data or because the disc contains data in an unrecognized format).

Figure 3A:
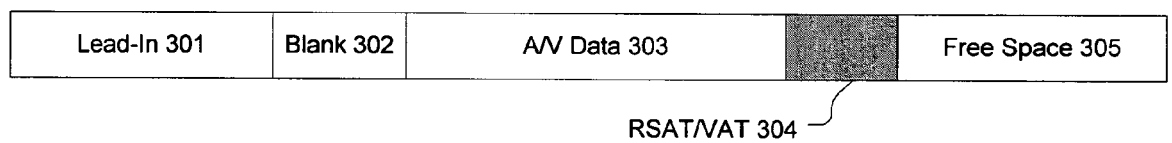
FIG. 3A is a diagram showing exemplary locations of user data and metadata on an unfinalized disc.

Referring now to FIG. 3A, an exemplary unfinalized disc 300 is shown. Lead-in area 301 is generally blank. User data area (e.g., containing DVD-Video data) 303 is followed by metadata area (e.g., containing RSAT and/or VAT tables) 304. Free space area 305 remains available for writing further data to the disc. Thus, referring again to FIG. 2, step 210 may comprise searching for metadata area 304, which may contain RSAT data, VAT data, or other data which may be useful in identifying the contents of the disc. (It will be recognized that, while the present invention is directed towards identifying RSAT and/or VAT data, a person skilled in the art may apply the inventive concepts presented herein to other data formats that currently exist or that may be developed in the future.) The metadata may then be used to identify the disc type at step 220.

Figure 3B:
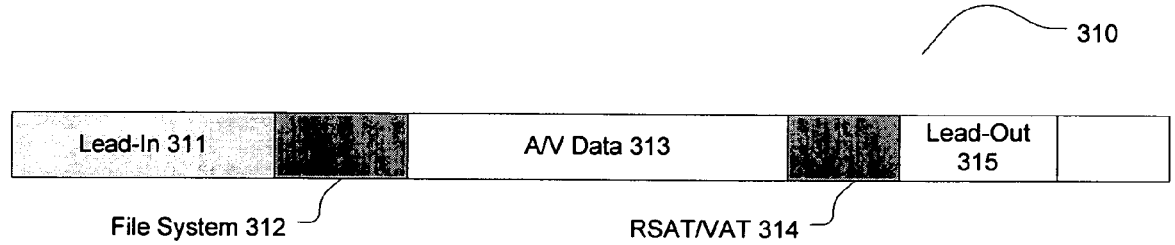
FIG. 3B is a diagram showing exemplary locations of user data and metadata on a finalized disc.

Referring now to FIG. 3B, an exemplary finalized disc 310 is shown. Lead-in area 311 generally contains lead-in data (e.g., pointers to File System 312 and last metadata area 314). Thus, referring again to FIG. 2, the method may find valid lead-in data at step 201, and proceed to the conventional step 230 of determining the disc type based on the lead-in data. Referring back to FIG. 3B, file system area 311 is generally populated with file system data. User data area 313 (e.g., containing DVD-Video data) is followed by metadata area 314 (e.g., containing RSAT and/or VAT tables), and lead-out area 315.

Thus, in a further embodiment, the method may comprise searching for a metadata area (e.g., an ECC block of sectors containing RSAT or VAT tables) and determining a disc type based on the contents of the metadata area. In another embodiment, the method may comprise reading data from the disc in accordance with the determined disc type. In one embodiment, the method may comprise searching for a metadata area that contains the last metadata recorded on a disc (e.g., the metadata recorded on a track that is further from the center of the disc [or further from edge of a disc, depending on the write direction] than any other metadata area recorded on the disc). In a still further embodiment, when the lead-in area contains valid lead-in data, the method may comprise a conventional step of reading data from the disc in accordance with the lead-in data.

In an exemplary embodiment, the method may further comprise estimating a starting sector of a block of sectors (e.g., an ECC block). Thus, the method may further include checking a block of sectors for RSAT or VAT data, starting at the estimated starting sector. Generally, the method may include checking a first sector of the ECC block for RSAT data and/or checking a last sector of the ECC block for VAT data. The method may further comprise determining that the disc is an unfinalized playable disc when RSAT or VAT data is found in the search step.

In a preferred embodiment, the method may further comprise repeating the determining step for a plurality of ECC blocks until a disc type can be determined. In a further or alternative embodiment, the method may limit the repeating step to a maximum number of repetitions (e.g., up to 5, 10, 20, 40, 60, or more ECC blocks may be checked, starting at the estimated starting sector, unless a disc type can be determined before the maximum number of repetitions is reached.) Thus, the method may further include the step of determining that the disc is unplayable when the maximum number of repetitions is reached.

Figure 4:
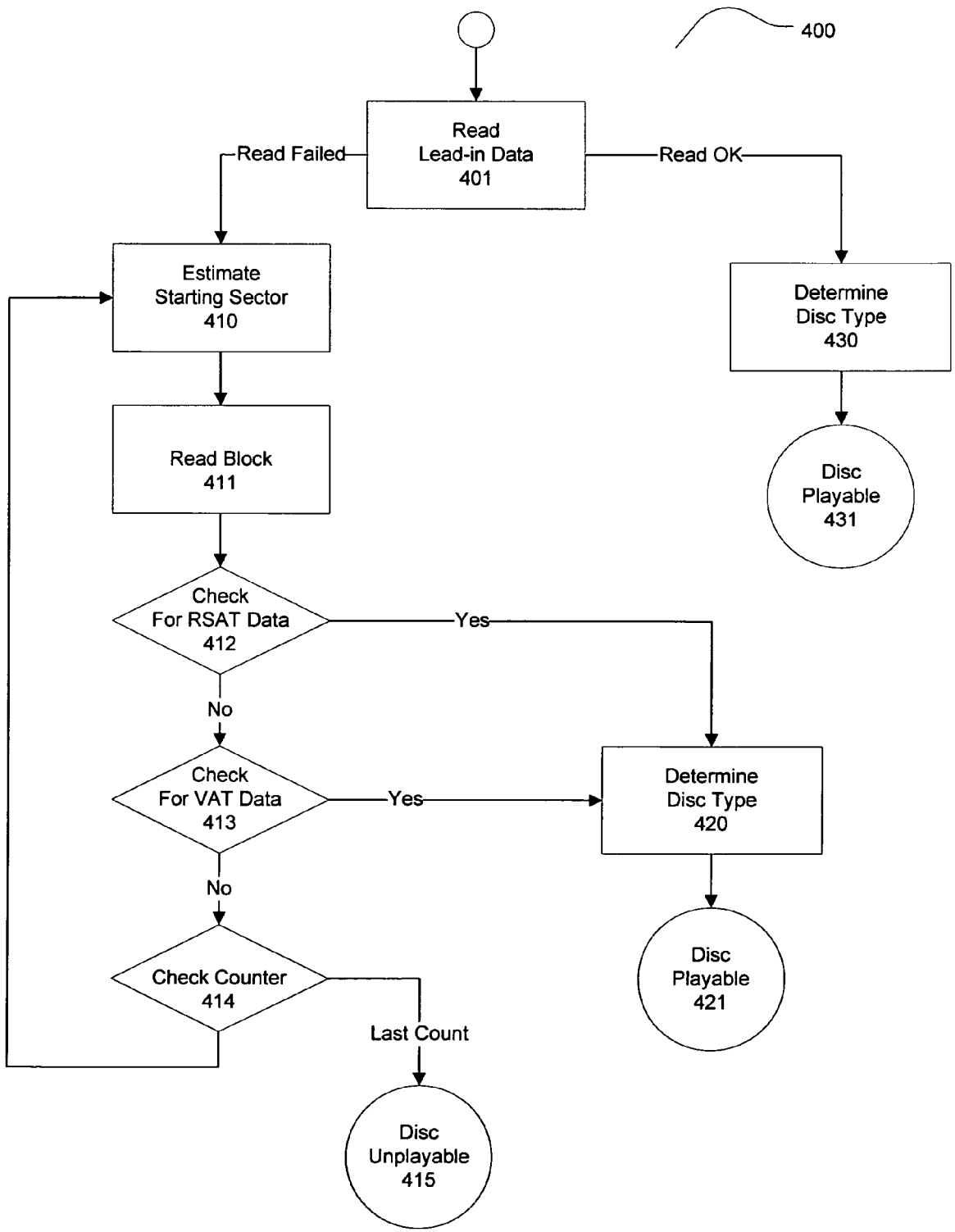
FIG. 4 is a flowchart showing another exemplary method according to the present invention.

Referring now to FIG. 4, a flowchart of exemplary method 400 is shown. In step 401, lead-in data is read from the lead-in area of an optical disc. When the lead-in data is read successfully (e.g., when the lead-in area contains valid lead-in data), the method may proceed to the conventional step 430 to determine the disc type based on the contents of the lead-in data and to play the disc (e.g., after step 431 of indicating [e.g., to a playback unit] that the disc is playable).

When the lead-in data is not read successfully (e.g., when the lead-in area does not contain valid lead-in data, or when a disc servo system otherwise indicates a failure to read the lead-in data), the method may proceed to step 410 to estimate a starting sector for a search (e.g., by instructing a servo system to seek to the end of a data area on the disc, and further instructing the servo system to provide an estimated starting sector at some offset from that endpoint). After the starting sector is determined, the method may proceed to step 411 to read a block of sectors (e.g., an error correcting code [ECC] block, which may comprise 16 or more sectors, depending on the disc standard) from the disc. After reading a block of data, the method may include a step of checking the data for recognized and/or recognizable data formats. For example, at step 412, the current block of data may be checked for RSAT data (e.g., RSAT data may often be found at sector 0 of the block [e.g., the first sector of an ECC block]). If no RSAT data is found, then at step 413 the block of data may be checked for VAT data (e.g., VAT data may often be found at sector 15 (0x0F) of the block [e.g., the last sector of an ECC block]). When recognized and/or recognizable data is found, the disc type can generally be determined from the contents of that data. For example, when RSAT or VAT data is found in the current block at steps 412 or 413, the method may proceed to step 420 to determine the disc type, and then play the disc (e.g., after step 421 of indicating [e.g., to a playback unit] that the disc is playable).

If no recognized and/or recognizable data is found in the current block, the method may proceed to either repeat the process for a different block of sectors or to determine that the disc is unplayable (e.g., after the entire disc has been checked and/or after a defined number of blocks have been checked). Thus, when neither RSAT nor VAT data is found in the current block at steps 412 or 413, the method may proceed to step 414 to check a retry counter. For example, a retry counter may be set to a maximum number of blocks to test before step 411. At step 414 the retry counter may be decremented. When the retry counter indicates that another block should be tested (e.g., when a decrementing counter is equal to or less than zero, or when an incrementing counter is equal to or greater than a threshold value), steps 411 through 414 may be repeated to check another block of sectors for disc type information.

The next block to be checked may be immediately after or before the current block, or may be at some offset from the current block. The distance between the current block and the next block to be checked may depend, at least in part, on the current value of the retry counter. For example, a bitwise-and operation may be performed on the retry counter (e.g., retry counter & 0x0F). When the result of the bit-wise AND operation is 0, the sector identification (e.g., an address of the sector on the disc) of the next block to be checked may be set to current_sector_id+0x200 (e.g., 32 16-sector blocks after the current block). When the result of the bit-wise AND operation is not zero, the sector ID of the next block to be checked may be set to current_sector_id+0x010 (e.g., at the next 16-sector block after the current block). It will be recognized that a person skilled in the art may choose different step sizes for selecting blocks of sectors to check, depending on the expected data format(s) to be searched for. Finally, when the retry counter indicates that no more sectors should be checked, the method may proceed to step 215 to indicate that the disc is unplayable (e.g., because the disc contains no data or because the disc contains data in an unrecognized format).

In a preferred embodiment, the recordable optical disc may comprise a write-once recordable optical disc, such as a DVD-R disc and/or a DVD+R disc. The method is particularly advantageous when performed in a DVD player adapted to read a write-once recordable DVD, where the DVD player does not have a wobble signal transducer.

Exemplary Software

The present invention also includes algorithms, computer program(s), and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device, or application-specific [integrated] circuit).

An Exemplary Apparatus

Figure 5A:
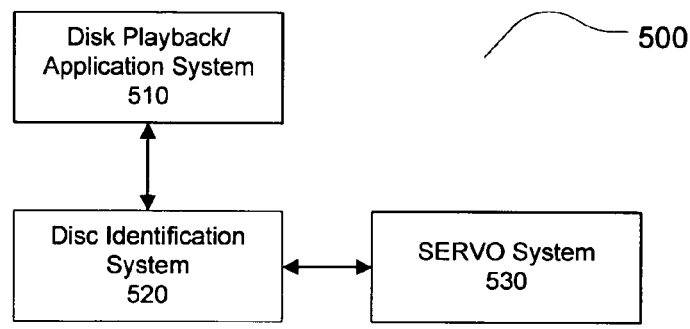
FIG. 5A is a diagram showing an exemplary disc playback apparatus according to the present invention.

In another aspect, the present invention concerns an apparatus for reading a recordable optical disc. The apparatus generally comprises (a) a disc playback system configured to process data from the disc, (b) a servo system configured to read data from a lead-in area on the disc, and (c) a disc identification system configured to process the data from the lead-in area and, when the data from the lead-in area does not contain valid lead-in data, to instruct the servo system to search an area on the disc. Thus, referring now to FIG. 5A, disc playback apparatus 500 may comprise disc playback system 510, disc identification system 520, and servo system 530. Disc playback system 510 may be configured to process data from the disc. Servo system 530 may be configured to read data from a lead-in area on the disc. Servo system 530 may also be configured to read any other area on the disc when it receives an appropriate instruction (e.g., from disc playback system 510 or from disc identification system 520). Disc identification system 520 may be configured to process the data from the lead-in area and, when the data from the lead-in area does not contain valid lead-in data, to instruct the servo system to search an area on the disc In a further embodiment, the disc information system may be further configured to check a block of sectors for RSAT or VAT data, starting at an estimated starting sector. In a preferred embodiment, the block of sectors comprises an ECC block. In another embodiment, the disc information system may be further configured to determine that the disc is an unfinalized disc when the ECC block contains RSAT data and/or VAT data.

In one exemplary embodiment, the disc information system may be further configured to repeat the determining steps for a plurality of ECC blocks until a disc type can be determined. The disc information system may be further configured to limit the repeating to a maximum number of repetitions (e.g., up to 5, 10, 20, 40, 60, or more ECC blocks may be checked, starting at an estimated starting sector, unless a desired metadata [e.g., RSAT and/or VAT data] can be located before the maximum number of repetitions is reached). Thus, the disc information system may be further configured to determine that the disc is unplayable when the maximum number of repetitions is reached.

Figure 5B:
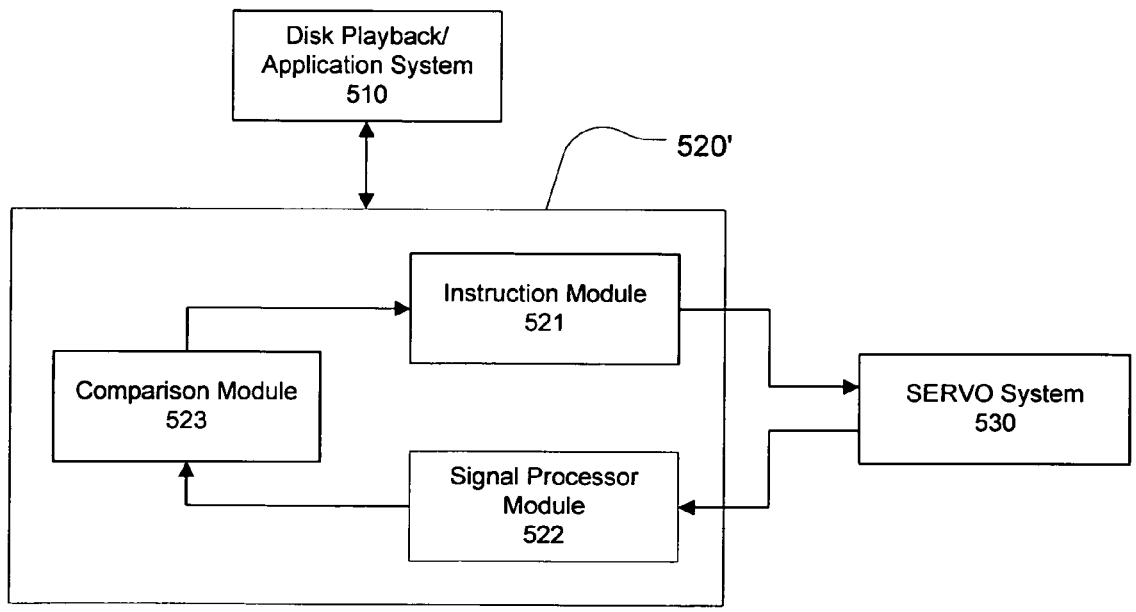
FIG. 5B is a diagram showing an exemplary disc identification system according to the present invention.

In additional embodiments, the disc identification system may comprise an instruction module configured to send instructions to the servo module. The disc identification system may comprise a signal processor module configured to receive signals from the servo system. The disc identification system may also comprise a comparison module configured to compare received data to predetermined data patterns. Thus, referring now to FIG. 5B, disc information system 520' (generally corresponding to disc identification system 520 of FIG. 5A) may comprise instruction module 521, signal processor module 522, and/or comparison module 523. Instruction module 521 may be configured to send instructions to servo system 530 and (optionally) to signal processor module 522. Signal processor module 522 may be configured to receive signals from servo system 530. Comparison module 523 may configured to compare received data to predetermined data patterns. For example, comparison module 523 may be configured to compare sectors in a block of data from the disc to known patterns of RSAT and/or VAT data to determine whether the block contains disc identification data.

Signal processor 522 may comprise a conventional digital signal processor (DSP), analog signal processor, or mixed (e.g., analog and digital) signal processor, configured to process data. Signal processor 522 may further include (or transmit processed ECC data to) a conventional error correction (ECC) circuit.

In a preferred embodiment, the recordable optical disc may comprise a write-once recordable optical disc, such as a DVD-R disc and/or a DVD+R disc. The disc player apparatus of the present invention is particularly advantageous where the servo system does not have a wobble signal transducer.

Exemplary Systems

In a further aspect, the invention relates to a system for reading data from a disc incorporating the methods and/or apparatus presented herein. The present invention may be implemented as a standalone DVD playing device. A disc playing device according to the present invention may communicate with a host device such as a computer, mobile computing devices such as personal digital assistants, cellular phones, media or MP3 players and the like, and/or other devices via one or more wired or wireless communication links. The disc playing device may be connected to memory such as random access memory (RAM), low latency nonvolatile memory such as flash memory, read only memory (ROM), and/or other suitable electronic data storage.

CONCLUSION/SUMMARY

Thus, the present invention provides methods, software, apparatus, and systems for reading a recordable optical disc. The present invention advantageously allows a disc playback device (e.g., a DVD player) to locate disc type information even on discs that are unfinalized (e.g., where no lead-in data has been recorded in the lead-in area of the disc). The present invention is particularly advantageous in disc playback devices that lack a wobble signal transducer. The present invention thereby allows users to view and/or share video content at any time without finalizing the disc (e.g., without recording on the lead-in area of the disc). Therefore, users may append additional data to the unfinalized disc and more fully utilize space on the disc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for reading a recordable optical disc, said method comprising the steps of
   a) determining whether a lead-in area on said disc contains valid lead-in data and, when said lead-in area does not contain valid lead-in data,
   b) searching metadata on said disc, wherein said metadata comprises RSAT or VAT data.

2. The method of claim 1, further comprising checking a block of sectors for said metadata, starting at an estimated starting sector.

3. The method of claim 2, wherein said block of sectors comprises an ECC block.

4. The method of claim 3, wherein said checking step comprises checking a first sector of said ECC block for RSAT data.

5. The method of claim 3, wherein said checking step comprises checking a last sector of said ECC block for VAT data.

6. The method of claim 3, wherein said determining step further comprises determining that said disc is an unfinalized disc when said ECC block contains RSAT data.

7. The method of claim 3, wherein said determining step further comprises determining that said disc is an unfinalized disc when said ECC block contains VAT data.

8. The method of claim 3, further comprising repeating said determining step for a plurality of ECC blocks until a disc type can be determined.

9. The method of claim 8, further comprising limiting said repeating step to a maximum number of repetitions.

10. The method of claim 9, further comprising determining that said disc is unplayable when said maximum number of repetitions is reached.

11. The method of claim 1, wherein said recordable optical disc comprises a write-once recordable optical disc.

12. The method of claim 1, wherein said recordable optical disc comprises a DVD-R disc.

13. The method of claim 1, wherein said recordable optical disc comprises a DVD+R disc.

14. The method of claim 1, performed in a DVD player adapted to read a write-once recordable DVD, wherein said DVD player does not have a wobble signal transducer.

15. An apparatus for reading a recordable optical disc, said apparatus comprising:
   a) a disc playback system configured to process data from said disc;
   b) a servo system configured to read data from a lead-in area on said disc; and
   c) a disc identification system configured to process said data from said lead-in area and, when said data from said lead-in area does not contain valid lead-in data, to instruct said servo system to search metadata on said disc, wherein said metadata comprises RSAT or VAT data.

16. The apparatus of claim 15, wherein said disc identification system is further configured to check a block of sectors for said metadata, starting at an estimated starting sector.

17. The apparatus of claim 16, wherein said block of sectors comprises an ECC block.

18. The apparatus of claim 17, wherein said disc identification system is further configured to determine that said disc is an unfinalized disc when said ECC block contains RSAT data.

19. The apparatus of claim 17, wherein said disc identification system is further configured to determine that said disc is an unfinalized disc when said ECC block contains VAT data.

20. The apparatus of claim 17, wherein said disc identification system is further configured to repeat said determining steps for a plurality of ECC blocks until a disc type can be determined.

21. The apparatus of claim 20, wherein said disc identification system is further configured to limit said repeating to a maximum number of repetitions.

22. The apparatus of claim 21, wherein said disc identification system is further configured to determine that said disc is unplayable when said maximum number of repetitions is reached.

23. The apparatus of claim 15, wherein said disc identification system comprises an instruction module configured to send instructions to said servo module.

24. The apparatus of claim 15, wherein said disc identification system comprises a signal processor module configured to receive signals from said servo system.

25. The apparatus of claim 15, wherein said disc identification system comprises a comparison module configured to compare received data to predetermined data patterns.

26. The apparatus of claim 15, wherein said recordable optical disc comprises a write-once recordable optical disc.

27. The apparatus of claim 15, wherein said recordable optical disc comprises a DVD-R disc.

28. The apparatus of claim 15, wherein said recordable optical disc comprises a DVD+R disc.

29. The apparatus of claim 15, wherein said servo system does not have a wobble signal transducer.

* * * * *